United States Patent [19]

Branfman

[11] 4,246,725
[45] Jan. 27, 1981

[54] PLANT TRANSPLANTING DEVICE

[75] Inventor: Alan Branfman, Northport, N.Y.

[73] Assignee: Northway Marketing Ltd., Northport, N.Y.

[21] Appl. No.: 30,339

[22] Filed: Apr. 16, 1979

[51] Int. Cl.³ .............................................. A01G 9/10
[52] U.S. Cl. .......................................... 47/73; 99/449; 220/404; 224/49
[58] Field of Search ................ 47/73, 81; 224/50, 55, 224/58, 45 R, 45 AA, 45 BA, 49; 220/404; 99/426, 449

[56] References Cited

U.S. PATENT DOCUMENTS

| | | | |
|---|---|---|---|
| 186,915 | 1/1877 | Wood | 224/50 |
| 1,638,693 | 8/1927 | Hooks | 47/73 |
| 1,766,818 | 6/1930 | Hafler | 47/73 |
| 2,005,928 | 6/1935 | Beghetti | 99/449 X |
| 2,973,218 | 2/1961 | Schaum | 47/73 X |
| 4,023,305 | 5/1977 | Harschel | 47/81 |
| 4,140,257 | 2/1979 | Peterson | 47/73 X |

Primary Examiner—Steven A. Bratlie
Attorney, Agent, or Firm—James J. Romano, Jr.

[57] ABSTRACT

New and improved transplanting device is provided for use in the transplanting of plants and is of particularly simple, lightweight, durable and inexpensive construction which can readily be modified for use with plant pots of widely varying sizes.

4 Claims, 4 Drawing Figures

4,246,725

PLANT TRANSPLANTING DEVICE

BACKGROUND OF THE INVENTION

1. Field of the Invention

This invention relates to a new and improved plant transplanting device.

2. Description of the Prior Art

Although a variety of plant transplanting devices are known in the prior art, the same will, in many instances, be found to require the use of relatively large numbers of basic parts, and attendant assembly and handling structures in the nature of hinges and handles and the like, to thus result in unnecessarily complex transplanting devices which are relatively expensive to manufacture and distribute. Of further disadvantage with regard to those of the prior art transplanting devices which do include handles or the like is the fact that the same are specifically designed to project well upwardly of the soil level in the plant pot as, for example, up to and around the plant pot rim to thus detract markedly from the esthetic appearance of the plant, and especially when used with the more highly styled plant pots now in vogue. In addition, the prior art transplanting devices will, in many instances, be found to be limited in utilization to one size and basic shape of plant pot, only, to thus require the manufacture and inventory of unnecessarily large stores of the transplanting devices so as to insure the capability of promptly meeting orders for differently sized transplanting devices for use with differently sized and/or shaped plant pots, and this problem is believed particularly acute as of this writing in view of the current, vastly increased consumer interest in and consumer demand for plants, and accordingly plant pots, of virtually all known types, shapes and sizes. Also, some of the prior art transplanting devices will be seen to be made of materials such as metals which can corrode as a result of continued exposure to the ever-present plant root-ball moisture and/or plant fertilizer solutions to thus markedly impair, if not destroy, the utility thereof and which, in any event, add unnecessary weight to the plant pot to thus render handling and/or hanging thereof more difficult. Too, many of the prior art transplanting devices will be seen to be somewhat bulky to thus result in relatively high distribution and/or storage costs therefor as should be obvious.

OBJECTS OF THE INVENTION

It is, accordingly, an object of my invention to provide a new and improved transplanting device which is of particularly simple and economical construction and which may be readily manufactured at minimal cost.

Another object of my invention is the provision of a transplanting device above which may be readily and conveniently modified by the consumer to fit a wide variety of differently sized and shaped plant pots.

Another object of my invention is the provision of a plant transplanting device as above which presents minimum interference with the esthetic appeal of a potted plant.

A further object of my invention is the provision of a plant transplanting device as above which is made from readily available, inexpensive and particularly durable, generally noncorrodable material, to thus provide for an extremely long useful life for the device.

A still further object of my invention is the provision of a plant transplanting device as above which is of particularly lightweight construction, and one which may be stored and/or transported in essentially flat condition.

SUMMARY OF THE DISCLOSURE

As disclosed herein, the new and improved plant transplanting device of my invention comprises a generally circular base member and a generally elongate handling strap which are fabricated, as by stamping, from an inexpensive, readily available pliable sheet material of light weight, and high durability and resistance to corrosion. The base member and handling strap are assembled so that generally equal lengths of the latter extend from the former, and are emplaced in a plant pot with the base member overlying the plant pot bottom and the handling strap lengths extending upwardly therefrom to or beyond the vicinity of the plant pot rim. Planting in the plant pot is then accomplished in conventional manner over the base member with the handling strap ends preferably being folded over and disposed below the soil line in the plant pot. Plant transplanting is subsequently effected, when necessary or desired, by unfolding the handling straps and simply grasping the ends of the handling strap lengths, the lifting of the transplanting device and the plant root ball from the plant pot, and the disposition of the transplanting device and plant root ball in the "new" pot. Alternatively, the plant root ball may simply be transferred to a "new," and presumably larger, plant transplanting device for disposition therewith in the "new" plant pot, thus leaving the "old" plant transplanting device perfectly suitable for re-use as described. Means are provided on the base member to greatly simplify modification in the size thereof to thus render the transplanting device readily adaptable to use in plant pots of widely varying shapes and/or sizes.

DESCRIPTION OF THE DRAWINGS

The above and other objects and significant advantages of my invention are believed made clear by the following detailed description thereof taken in conjunction with the accompanying drawings wherein.

DETAILED DESCRIPTION OF THE INVENTION

Figure 1:
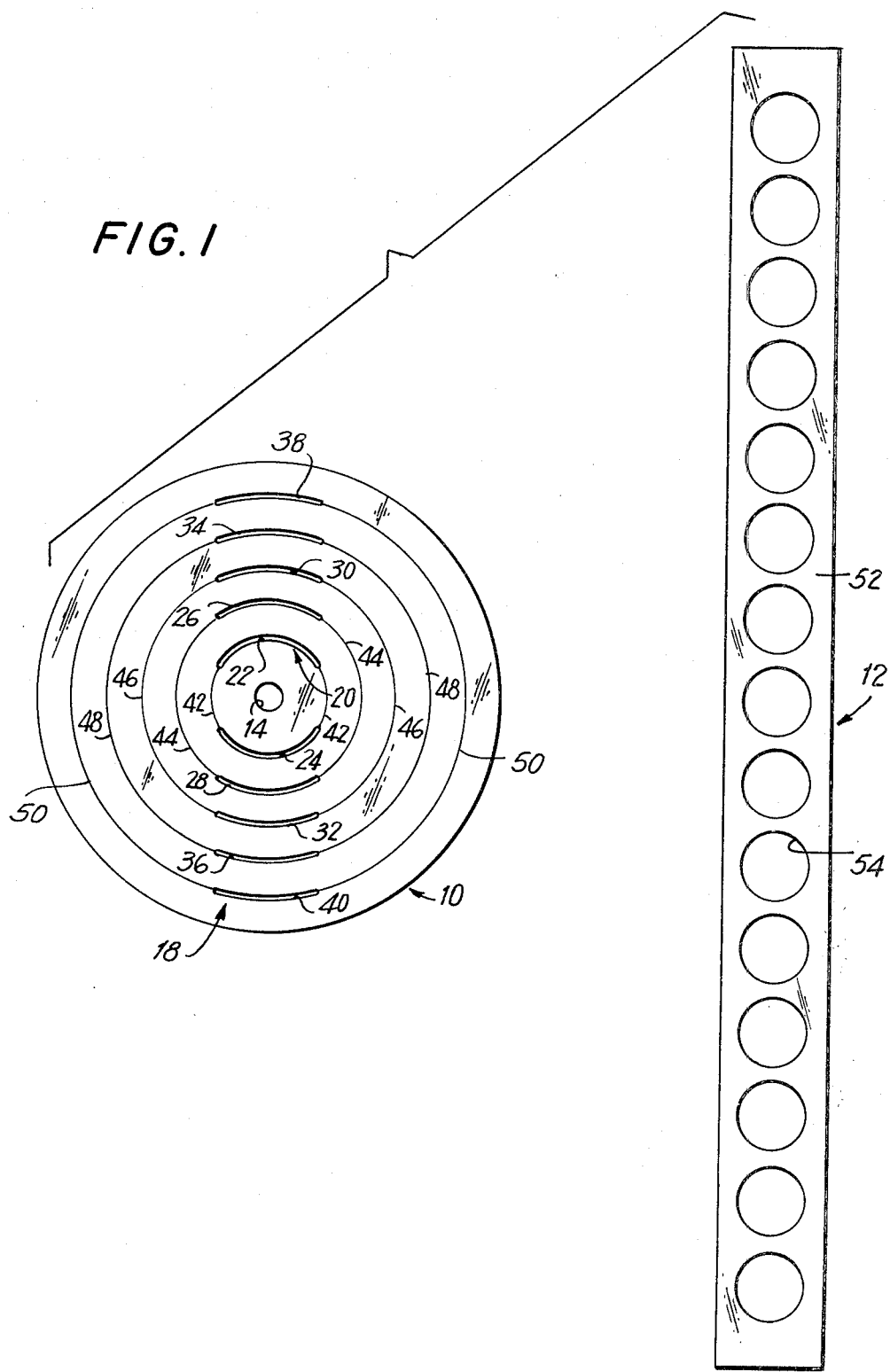
FIG. 1 is a top elevational view of the base member and handling strap of a new and improved transplanting device constructed and operative in accordance with the teachings of my invention and shown dis-assembled.

Referring now to FIG. 1 of the drawings, the base member and handling strap of a new and improved transplanting device constructed and operative in accordance with the teachings of my invention are indicated generally at 10 and 12, respectively.

The base member 10 is preferably of the depicted, generally circular configuration and comprises one or more aperatures 14 formed as indicated in the central portion thereof to provide for plant water drainage as described in greater detail hereinbelow. Arrays of spaced, generally arcuate assembly slots or like cut-outs are indicated generally at 18 and 20 and will be seen to extend generally diametrically of the base member 10. The assembly slots, which are generally equally sized, are arranged as shown to form cooperating pairs, with the respective slots of each of said pairs being disposed to opposite sides of the central portion of the base member 10. More specifically, these assembly slot pairs are formed by slots 22 and 24, slots 26 and 28, slots 30 and 32, slots 34 and 36, and slots 38 and 40, respectively; it being readily understood by those skilled in this art that a greater or lesser number of assembly slot pairs may be utilized.

Each assembly slot pair is connected as illustrated by arcuate scores or like indentations of the same radius formed in the surface of the base member 10; with assembly slots 22 and 24 being connected by scores 42, slots 26 and 28 being connected by scores 44, slots 30 and 32 being connected by scores 46, slots 34 and 36 being connected by scores 48, and slots 38 and 40 being connected by scores 50.

The handling strap 12 comprises a generally elongate strip 52 having a plurality of generally equally spaced cut-outs or the like 54 formed therein as shown. The strip 52 is of a width which will enable the ready insertion and drawing thereof into and through the assembly slots of the slot arrays 18 and 20 in base member 10.

Preferably, the base member 10 and handling strap 12 are fabricated from a readily available, low cost, durable and lightweight material in the nature of polyethelene which would, of course, be substantially inert with regard to plant root ball moisture and plant fertilizer solutions to thus prevent corrosion and attendant loss of function of the transplanting device. Additional significant advantages of the use of polyethelene or the like reside in the pliability thereof which will enable the transplanting device to readily conform as necessary to different plant pot interior configurations, and in the fact that the base member 10 and handling strap 12 can be simply and economically fabricated from readily available commercial sized rolls or sheets of the same through use of appropriately configured stamping dies. Generally clear polyethelene is preferred for reasons of economy and to minimize handling strap end visibility for reasons made apparent hereinbelow.

Figure 2:
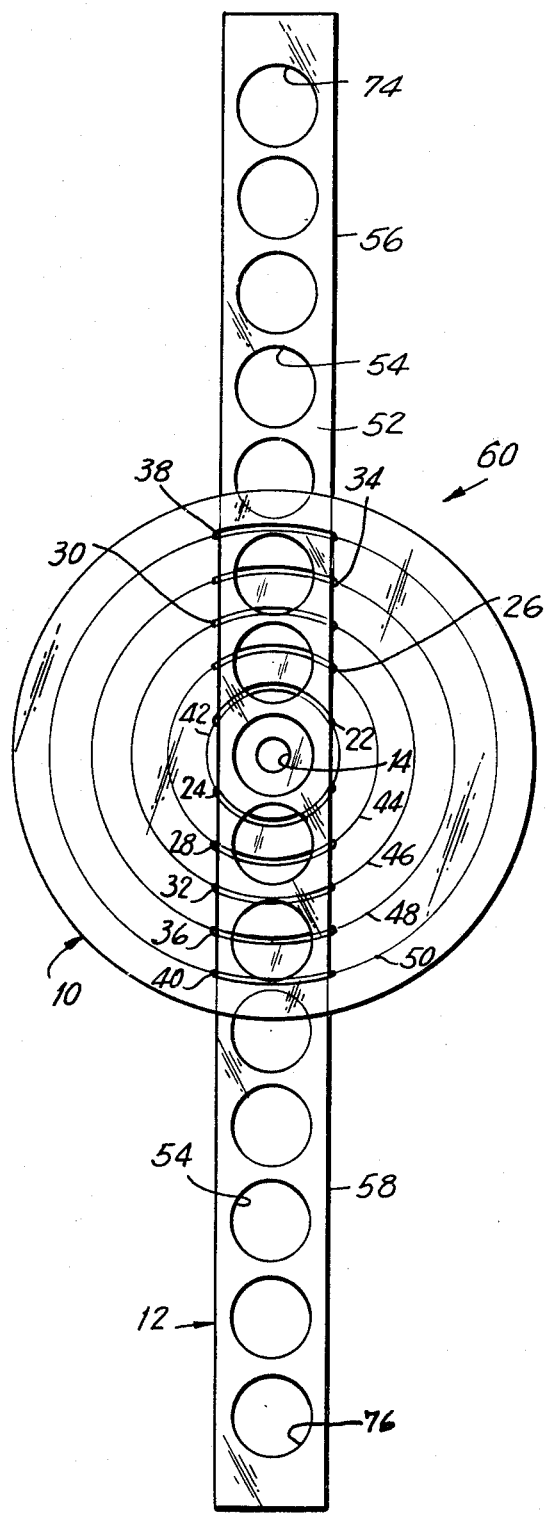
FIG. 2 is a top elevational view of the base member and handling strap of FIG. 1 representatively assembled to form the transplanting device of my invention.

Assembly of the transplanting device of my invention from the full size base member 10 and handling strap 12 as depicted in FIG. 1 is readily and conveniently effected by the simple insertion of one end of the handling strap into and through assembly slots 38 and 40 in the base member so that the handling strap underlies the relevant rim portions of the base member, and the drawing of the handling strap therethrough to the position wherein there are generally equal lengths 56 and 58 of the handling strap extending from the base member, all in the manner indicated generally at 60 in FIG. 2 for the assembled transplanting device. The handling strap 12 is, of course, disposed relative to base member 10 so that one of the apertures 54 in the former underlies the drainage aperture 14 in the latter for obvious purpose and, to this effect, it will be understood that one of the apertures 54 is formed in handling strap 12 generally intermediate the respective ends thereof.

Figure 3:
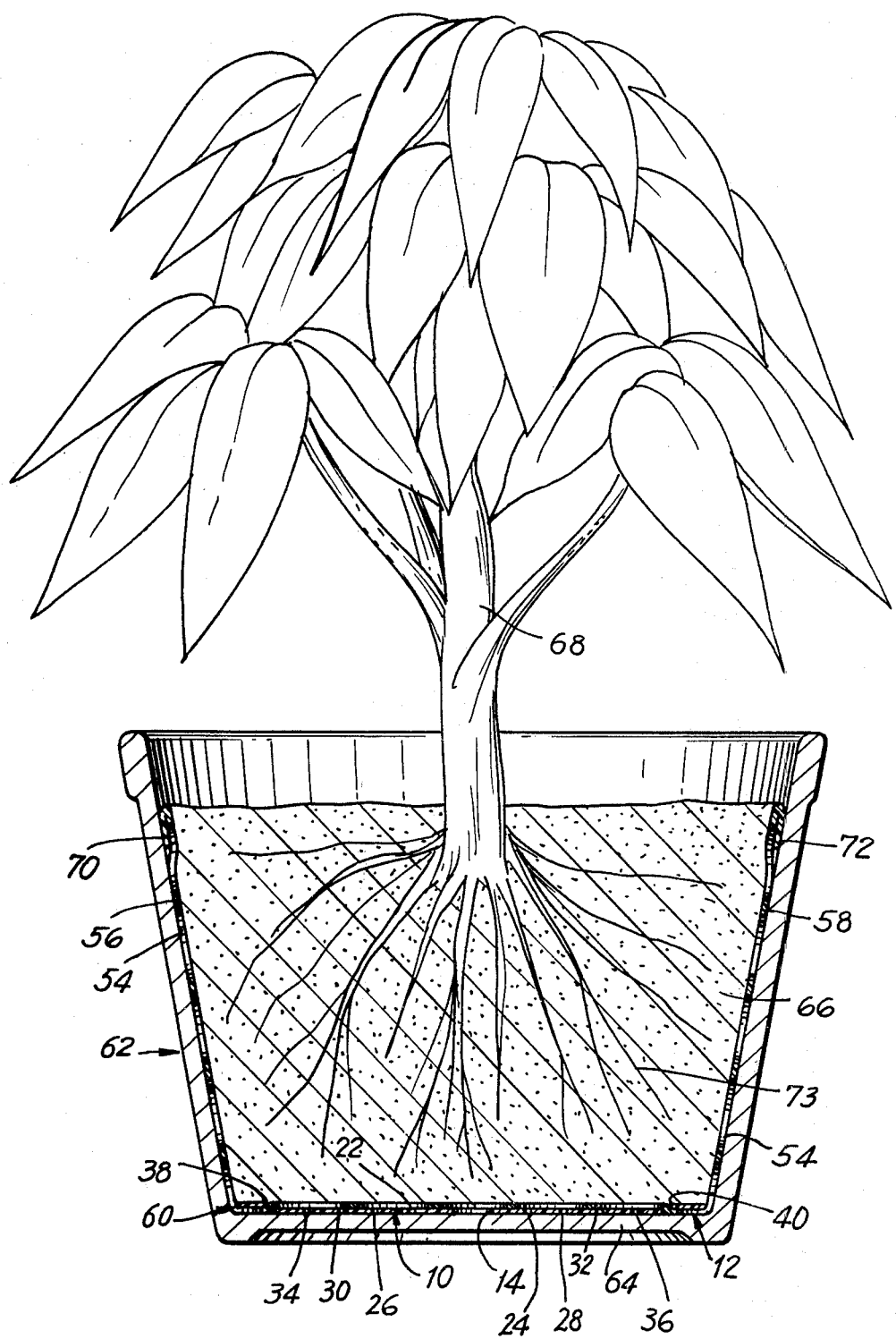
FIG. 3 is a cross-sectional view taken generally vertically of a potted plant having the transplanting device of my invention operatively positioned therein.

Representative use of the assembled transplanting device 60 of FIG. 2 in a plant pot having a bottom diameter and depth which are generally commensurate with the diameter of base member 10 and the extent of handling strap lengths 56 and 58, respectively, is illustrated in FIG. 3 and, as seen therein, comprises the disposition of the device in a plant pot 62 in such manner that the base member 10 overlies the plant pot bottom 64 with the respective lengths 56 and 58 of the handling strap 52 extending upwardly therefrom as shown along the inner walls of the plant pot 62.

The plant pot 62 is then filled in normal manner with soil as indicated at 66 and the plant 68, or seedling or seed as the case may be, emplanted therein with the respective ends 70 and 72 of the handling strap 12 folded over as depicted in FIG. 2 and buried out of sight just below the level of the soil 66 in the plant pot to prevent unsightly interference by the strap ends with the esthetic appeal of the potted plant. Alternatively, the handling strap ends may be cut down and left unfolded to extend very slightly, if at all, above the level of the soil 66 adjacent the rim of the plant pot. In such instance, this factor, taken in conjunction with the use of generally clear polyethelene in the fabrication of the handling strap 12 will advantageously minimize, if not totally eliminate, visibility of the handling strap ends 70 and 72 and attendant unsightly interference with the esthetic appeal of the potted plant.

Subsequent growth of the plant 68 will, of course, result in the creation of a firm bond between the plant roots 73 and soil 66 (hereinafter the "root ball") and the base member 10 and handling strap 12 of the transplanting device; with the migration of the continually moistened soil and growth of the plant roots into apertures 54 of the handling strap 12 functioning, of course, to materially and advantageously strengthen that bond.

Growth of plant 68 in plant pot 62 then proceeds in a normal manner until transplanting thereof to a larger, or simply different, plant pot becomes necessary or desirable. At such time transplanting of the plant through use of the transplanting device 60 of my invention is readily and conveniently effected by the simple clearing away of the soil 66 adjacent the ends 70 and 72 of the handling strap 12, the unfolding, if required, and grasping of the respective, now exposed ends of handling strap 12 through use of the outermost apertures as indicated at 74 and 76 in FIG. 2 as sockets for the fingers of the grasping hands; whereupon the entire plant root ball-transplanting device combination is lifted as a unit from plant pot 62 and simply deposited in obvious manner in the "second" plant pot with minimal loss of soil and/or roots from the root ball, and little if any shock or trauma to the plant 68. Subsequent transplantation of the plant 68 from the "second" plant pot to a "third" plant pot, as might in some instances prove necessary or desirable, may, of course, be effected through use of the same transplanting device 60 in the same manner with, it is believed, minimal loss in effectiveness and/or convenience in those instances wherein the "second" plant pot to which the plant had previously been transplanted as described is materially larger in terms of bottom diameter and/or depth than plant pot 62. This is to say that, in such instances, some inconvenience in locating and grasping handling strap ends 70 and 72 and/or some loss of the "new" and by now presumably substantially larger root ball, may occur, with the transplanting device remaining effective, however, for the purposes disclosed.

Figure 4:
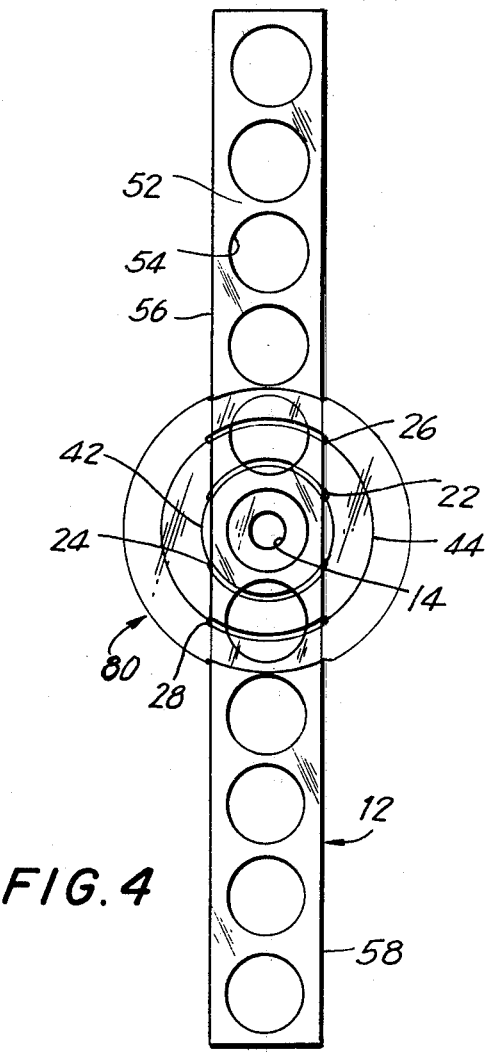
FIG. 4 is a top elevational view of the transplanting device of my invention as modified for use with a smaller plant pot.

Modification of the transplanting device 60 of my invention for effective use in a plant pot having, for example, a significantly smaller diameter and depth than plant pot 62 of FIG. 3, is readily and conveniently accomplished by reduction in the diameter of base member 10 and in the length of handling strap 12. More specifically, and for use in a plant pot having a bottom diameter generally equivalent to the diameter between assembly slots 30 and 32, it will be understood that appropriate reduction in the diameter of base member 12 is readily and conveniently accomplished, for example, by the insertion of one blade of a pair of common scissors in slot 30, the cutting therefrom along score 46 to slot 32, and the cutting from the latter along score 46 to slot 30 to complete base member diameter reduction, with the said slots and scores functioning as substantially infallible guides for this procedure. Reduction in the overall length of assembly strap 12 to arrive at shorter effective strap lengths than those indicated at 56 and 58 in FIG. 3 is readily and conveniently accomplished by the simple cutting, again for example, with a pair of common scissors, of an appropriate length from assembly strap 12, with this cut of course being made generally intermediate adjacent apertures 54 to insure the disposition of a complete one of the same close to the "new" end of the handling strap for use as a finger socket as discussed hereinabove. An assembled transplanting device of base member diameter and handling strap length reduced as described is illustrated and indicated generally at 80 in FIG. 4 which is believed to make clear that, in such instance, handling strap 12 would of course extend through assembly slots 26 and 28 in base member 10 for assembly of the transplanting device.

Other and different modification of the transplanting device 60 may, of course, be made, to include different reductions in the diameter of base member 10 through use of different pairs of assembly slots and connecting scores as guides for cutting and/or different reduction in the length of handling strap 12 by cutting the same at a different location; it being clear that modification of the base member 10 need not require modification of the handling strap 12, and vice versa.

For use in instances wherein the original transplanting device 60 has been modified to be of reduced size as discussed directly hereinabove, it may be understood that transplanting may alternatively be effected by lifting as described of the plant root ball-transplanting device combination as a unit from the plant pot, the disposition thereof adjacent to a "second" and larger plant pot wherein has been operatively disposed as described a larger or unmodified "second" transplanting device, the simple "peeling" of the transplanting device from the root ball, and the grasping and disposition of the latter in the "second" plant pot to overlie the "second" transplanting device, again with minimal loss of soil and/or roots from the root ball, and little if any shock or trauma to the plant 68. In each such instance, the original transplanting device 60 remains perfectly satisfactory for re-use in any of the manners described hereinabove.

By all of the above is believed made clear that a particularly versatile transplanting device is provided which, through simple use of a pair of common scissors, only, may be made fully effective for the purposes disclosed for use with plant pots ranging in bottom diameter from that somewhat larger than the diameter of base member 10 of FIG. 1 to that generally as large at the diametrical distance betweem assembly slots 26 and 28, and/or ranging in effective depth (as measured along the inner wall of the plant pot) to an extent limited only by the uncut length of handling strap 12 as originally furnished.

Also of significant advantage with regard to the transplanting device of my invention is the fact that, as a result of the pliability of the base member 10 and handling strap 12, the device may readily and effectively be utilized in conjunction with plant pots having rounded bottoms and/or sides, of the type increasingly in vogue for example for hanging plants; it being believed apparent that the said base member and handling strap are particularly adaptable for conformity to those plant pot configurations.

Although the dimensions of the transplanting device of my invention may vary quite widely, representative of those dimensions would be a base member of twelve inch diameter reducible as described by cutting to a diameter of six inches, and a handling strap of thirty six inches uncut length and two inch width.

As an alternative manner of assembly of the transplanting device of my invention in those instances wherein the base member 10 as ultimately used includes at least two pairs of assembly slots, it may be understood that the handling strap 12 may be drawn or interwoven through all of the said assembly slots in manner which should be obvious to those skilled in this art to provide for somewhat firmer base member-handling strap interaction although, of course, at some slight decrease in simplicity of device assembly.

Various changes may, of course, be made in the disclosed embodiment of my invention without departing from the spirit and scope thereof as defined in the appended claims.

What is claimed is:

1. In a device for the transplanting of plants which includes a base member for disposition in a plant pot beneath the plant root ball and a handling strap for attachment to said base member in such manner that handling strap portions will extend upwardly therefrom toward the plant pot rim to enable ready removal of the plant root ball from the plant pot by the lifting of said base member therefrom through grasping of said handling strap portions, the improvements comprising, means to attach said handling strap to said base member at differently spaced locations on the latter in general accordance with the size of the bottom of the plant pot, and wherein said base member is of generally circular configuration, and said attachment means comprise a plurality of pairs of differently diametrically spaced assembly slots, with the assembly slots of each of said pairs being formed respectively to opposite sides of the central portion of said base member and sized to enable the insertion of said handling strap therethrough whereby, said handling strap may be attached to said base member at said differently spaced locations by the insertion of said handling strap through differently spaced pairs of said assembly slots, said base member and said handling strap being formed of materials which can be readily cut to reduce the respective sizes thereof whereby, said transplanting device may be readily adapted for use with differently sized plant pots.

2. In a transplanting device as in claim 1 wherein, said base member comprises generally arcuate scores formed therein to connect the respective assembly slots of each assembly slot pair whereby, said scores and assembly slots may be used as guides in the cutting away of an outer portion of said base member to adapt the transplanting device for use with differently sized plant pots.

3. In a transplanting device as in claim 1 wherein, said handling strap comprises spaced apertures formed therein for use as sockets for the fingers in the grasping of said handling strap portions.

4. In a transplanting device as in claim 1 wherein, said base member and said handling strap are made from polyethylene sheet material.

\* \* \* \* \*